3,298,918
WATER SOLUBLE PHENOLIC ESTER COMPOSITIONS

Darrell D. Hicks and John E. Masters, Louisville, Ky., assignors, by mesne assignments, to Celanese Coatings Company, a corporation of Delaware
No Drawing. Filed Nov. 27, 1963, Ser. No. 326,380
10 Claims. (Cl. 260—78.5)

This invention pertains to aqueous coating compositions. In another of its aspects, the invention pertains to water soluble phenolic esters. In still another of its aspects, the invention relates to a process for preparing such water soluble phenolic esters.

Conventional protective coating compositions for use both in industry and in the home are generally dissolved in organic solvents. These solvents, being of a flammable nature, present a hazard both in the application and in the storage of the paint. On the basis of flammability alone, water based coating compositions are much preferred. In addition to the reduction in fire hazards, the demand for water soluble coating compositions is based on the fact that water is a cheap, odor-free and readily available thinner.

Water soluble resinous compositions have been prepared by neutralizing a maleinized oil or alkyd resin with an alkali, ammonia, or an amine. This type of water soluble composition has been widely accepted by the protective coating industry. However, one of the disadvantages of maleinized oils and alkyd resins is their lack of alkali resistance. Drying oils and alkyd resins contain a considerable number of ester groups. These ester groups are the reaction products of acids with aliphatic polyols, for instance ethylene glycol, glycerine, pentaerythritol and the like. Such esters are readily hydrolyzed by caustic compounds, resulting in the breaking down of the polymer structure with resulting film failure.

Phenolic esters, i.e., esters resulting from reaction of an acid and a phenol, are known to be much more resistant to alkaline hydrolysis than aliphatic polyol esters. This invention contemplates the preparation of water soluble resins from phenolic esters to provide protective coatings of superior alkali resistance. In accordance with this invention, protective coatings are produced in which all ester linkages in the coating structure are aromatic rather than aliphatic.

Water soluble phenolic ester condensates of this invention are prepared by (1) reacting a dihydric phenol with a semi-drying or drying oil acid; (2) condensing the phenolic ester with maleic acid, maleic anhydride, fumaric acid or itaconic acid; and (3) dissolving the condensate in water which contains ammonia or a water soluble amine. The dihydric phenol of reaction (1) can be a polymeric diphenol resulting from the reaction of a diphenol with less than an equivalent amount of a dicarboxylic acid.

Phenolic hydroxyl groups are not readily esterified by acids using the conventional esterification techniques due to the acidic nature of the phenolic group. In order to form an ester from a phenol and an organic carboxylic acid, high temperature, strong catalysts and long reaction times are required. Phenolic esters have been prepared from phenols and acid chlorides using caustic to remove the hydrogen chloride formed in the reaction. This method has the disadvantage in that acid chlorides are not readily available and are expensive. In addition, the solid inorganic chloride formed in the reaction is difficult to remove.

Phenolic esters can be prepared readily by reacting a phenol-acetate with a carboxylic acid having a higher boiling point than acetic acid. In this process, the phenol-acetate is formed from the phenol and acetic anhydride. This phenol-acetate is then reacted with the carboxylic acid, wherein the carboxylic acid replaces the acetate group on the phenol and the formed acetic acid is removed from the reaction mixture by distillation. U.S. Patents 2,502,518 and 2,595,343 describe such a reaction of a phenol acetate and a carboxylic acid in detail and are herein incorporated as references.

The phenolic ester condensates of this invention are prepared by starting with the phenol-acetate. This phenol-acetate which is the diacetate ester of a dihydric phenol, is reacted with two equivalents of fatty acid followed by a condensation reaction with maleic anhydride, fumaric acid, etc. This condensate is then dissolved in aqueous ammonia or amine solution. As an alternate method of preparing these compositions, the fatty acid can be condensed first with the unsaturated dicarboxylic acid or anhydride and this reaction product is then interchanged with the phenol-acetate.

This reaction can also be conducted by reacting one molar equivalent of diphenol with two molar equivalents of acetic anhydride. Without removing the liberated acetic acid, fatty acid can be added and the condensation reaction can be carried out while removing all the acetic acid. When all the acetic acid is removed, maleic anhydride is condensed followed by solution in aqueous ammonia or amine.

More complex condensation products can be obtained by reacting a dicarboxylic acid with the diphenol-diacetate wherein the equivalents of dihydric phenol are used in excess over the equivalents of dicarboxylic acid. The resulting polymeric phenol-acetate is further reacted with a fatty acid and maleic anhydride as described hereinbefore.

Phenolic esters used in this process can best be described by the general formula

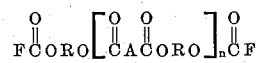

wherein F is the hydrocarbon portion of an unsaturated fatty acid; R is the aromatic nucleus of a dihydric phenol; and A is the hydrocarbon portion of an aliphatic dicarboxylic acid.

The value of $n$ can be 0, 1 or 2. When no dicarboxylic acid is used, $n$ is 0. When 1 molar equivalent of dicarboxylic acid is used, with 2 molar equivalents of diphenol, $n$ is equal to 1. When 2 molar equivalents of dicarboxylic acid are used with 3 molar equivalents of diphenol, $n$ is 2.

The fatty acids contemplated for use in this invention are unsaturated fatty acids containing 10 to 24 carbon atoms, derived from drying oils and semi-drying oils, that is, oils having iodine values in the range of 100 to 200. Such fatty acids are the acids obtained from dehydrated castor oil, corn oil, cottonseed oil, linseed oil, oiticica oil, perilla oil, safflower oil, soybean oil, sunflower oil, tung oil, and the like. Of course fatty acids obtained from other sources and purified fatty acids can also be used. These acids are palmitoleic, oleic, erucic, linoleic, linolenic, licanic, myristoleic, eleostearic, arachidonic, clupanodonic, and the like.

The dihydric phenols that can be used in preparing these phenolic esters are phenolic compounds that contain two phenolic hydroxyl groups attached to the same aromatic nucleus, or to two different aromatic nuclei, such as the fused ring system of naphthalene, or of dual aromatic rings attached by carbon chains or other atoms. Such dihydric phenols are resorcinol, hydroquinone, bisphenol, (p,p'-dihydroxydiphenyl propane), dihydroxydiphenyl sulfone, dihydrobenzophenone, dihydroxy naphthalene, dihydroxydiphenyl, dihydroxydiphenyl methane, dihydroxydiphenyl sulfide, and the like.

Dicarboxylic acids can be incorporated into these phenolic esters in order to introduce modifying features into the resinous compositions and in the cured films resulting from the application of the resins. Modifications in the melting point and solubility of the resins and the viscosity of the resin solutions can be made. The hardness, mar resistance, flexibility and impact resistance of the cured films can be altered by the proper choice of dicarboxylic acids. Dicarboxylic acids that can be used to impart such modifications are aliphatic dicarboxylic acids containing 4 to 36 carbon atoms. Such acids are succinic acid, glutaric acid, pimelic acid, adipic acid, suberic acid, azelaic acid, and sebacic acid, containing no polymerizable double bonds. Additional dicarboxylic acids are the so-called dimeric acids which result from the dimerization reaction of an unsaturated fatty acid. These acids will contain 20 to 36 carbon atoms depending upon the fatty acid monomer used. These acids in some cases, do contain unsaturation, but these unsaturated groups are not normally considered to be of a polymerizable nature. The dimeric fatty acids can be obtained from the dimerization of linoleic acid which is available in soybean oil, cottonseed oil, and other commercial oils. These dimeric acids are described in U.S. Patent 2,482,761.

It must be remembered that when dicarboxylic acids are incorporated into the phenolic ester structure, a molar excess of dihydric phenol is used over the dicarboxylic acid. In other words, one to two mols of dicarboxylic acid are used with two to three mols of diphenol respectively. These ratios are used in order to obtain phenolic termination of the polyester for further reaction with the monomeric fatty acids. Phenolic polyesters can be made which contain ratios of diphenol to diacid greater than 3 to 2. However, in this invention, these higher molecular weight polyesters are not practical. The resulting polyesters have high melting points and their solutions have high viscosities making these polymers very different to work with.

In forming the phenolic ester condensates of this invention, an unsaturated dicarboxylic acid is condensed with the fatty acid portion of the phenolic ester. The reactions of unsautrated dicarboxylic acids, such as maleic anhydride, maleic acid, fumaric acid, or itaconic acid, with fatty acids are well known. Whether the reaction results in a condensate or an adduct depends upon the type unsaturation in the fatty acid. If conjugated double bonds are present in the acid, a Diels-Alder reaction takes place to form an adduct. If there are no conjugated double bonds present, a reaction associated with Clocker and described in U.S. Patent 2,188,182 takes place. The contemplated reaction is generally carried out at a relatively high temperature above 180° C., generally 200° C. to 250° C. However, by the use of certain catalysts, this temperature can be lowered to 100° C. to 120° C.

In order to obtain water soluble phenolic ester condensates, the acid value of said condensates must be in the range of 80 to 275. The acid value will, of course, depend upon the ratio of unsaturated dicarboxylic acid that has been reacted with the phenolic ester. This ratio is normally about 0.7 to 2 mols of unsaturated dicarboxylic acid to 1 mol of phenolic ester. The ratio of reactants required to give the desired acid value can be readily determined by calculation since the molecular weights of all the reactants are known.

To render the phenolic ester condensates water soluble, ammonia or water soluble amines are used. Water soluble amines are preferred because more viscous products result when ammonia is used. Water soluble amines are well known, and the amine will depend on the end use of the final composition. Films of these compositions will be cured at temperatures up to 200° C. The elevated temperatures will decompose the amine salts either to free amines which will volatilize from the films, or to the amides. It is preferred to use a volatile amine, that is, an amine which will volatilize from the film at the temperature at which the film is cured. It is desirable to free the film of amine salt, either by decomposing the salt and volatilizing the amine or by forming the amide, since it is well known that amine salts are associated with poor water resistance. When volatile water soluble amines are used, the resulting films will contain carboxyl groups. These carboxyl groups readily lend themselves to systems employing water soluble carboxy-cross-linking agents. Cured films of these water soluble phenolic ester condensates can also be made, however, without the addition of a curing agent. The water soluble amines contemplated herein are used in an amount sufficient to confer water solubility on the phenolic ester condensate. As a maximum, one mol of amine per carboxy group present in the ester is employed. However, water solubilization can be obtained by using less than this amount. Ordinarily, 5 to 20 percent by weight of amine based on the weight of the ester, is sufficient. Suitable water soluble amines are ethyl amine, diethyl amine, triethyl amine, propyl amine, dipropyl amine, isopropyl amine, diisopropyl amine, butyl amine, dibutyl amine, 2-ethylhexyl amine, ethanolamine, methyl ethanolamine, dimethyl ethanolamine, diethyl ethanolamine, and the like.

This invention can perhaps be better understood by reference to specific examples. Parts in these examples is understod to be parts by weight.

*Example 1*

To a one-liter flask equipped with stirrer, reflux condenser and thermometer are added 114 parts of bisphenol and 102 parts of acetic anhydride. Heat is applied raising the temperature to 146° C. where vigorous refluxing is obtained. The temperature is held at 140° C. to 146° C. for three hours and twenty minutes, and is then lowered to 50° C. The reflux condenser is changed to a downward distillation condenser and 280 parts of linsed oil fatty acid are added to the flask. Nitrogen gas is passed over the solution and heat is applied. At a temperature of 120° C., distillation begins. Heat is applied over a period of five hours and forty minutes while the temperature rises to 245° C. 109 parts of distillate are recovered. The temperature is lowered to room temperature and 98 parts of maleic anhydride are added to the flask. The condenser is changed to a reflux condenser and the nitrogen gas blanket is removed. Heat is applied raising the temperature to 200° C. The temperature is held at 200° C. to 210° C. for four hours, after which time the condensation of maleic anhydride with the phenolic ester is complete.

To a 500 ml. flask equipped with stirrer, reflux condenser and thermometer are added 60 parts of this phenolic ester condensate. Heat is applied and at 83° C., 70 parts of a 90/10 water/methylethanol amine solution are added slowly to the flask over an 18-minute period. A very viscous solution results. This solution is further diluted with 70 parts of tap water and is cooled. The resulting aqueous solution has a solid content of 32.2 percent, a Gardner-Holdt viscosity of $Z_4$ and a Gardner color of 15 to 16.

*Example 2*

To a 2-liter flask equipped with reflux condenser, thermometer and stirrer are added 154.8 parts of bisphenol and 139.2 parts of acetic anhydride. Heat is applied raising the temperature to 142° C. where refluxing begins. The temperature is held at 142° C. for three hours under strong reflux. Heat is removed and the temperature drops to 44° C. Linseed oil fatty acids, 190.2 parts, and adipic acid, 49.2 parts, are added to the flask, the condenser is changed to a distillation condenser and nitrogen gas is applied over the solution. The temperature is raised to 120° C. where distillation of acetic acid begins. The temperature slowly rises to 265° C. with continuous distillation of acetic acid. After nine hours heating, no more acetic acid distills, the total distillate being 143 parts. Heat is removed and 66.6 parts of maleic anhydride are added to the flask. The temperature is raised to 200° C. and is held between 195° C. and 204° C. for four hours and forty-five minutes to form the phenolic ester condensate.

The temperature of the flask contents is lowered to 90° C. and a solution containing 560 parts of water and 66 parts of methylethanol amine is added slowly to the flask while keeping the temperature at 90° C. to 95° C. Upon cooling to room temperature, a clear viscous solution is obtained having a solids content of 44 percent, a Gardner-Holdt viscosity of U and Gardner color of 16 to 17.

*Example 3*

To a 3-liter flask equipped with thermometer, stirrer and reflux condenser, are added 456 parts of bisphenol and 408 parts of acetic anhydride. Heat is applied raising the temperature to 145° C. where moderate refluxing begins. The temperature is held at 141° C. to 145° C. for one hour. Heat is removed and the temperature of the reactants is lowered to 24° C. Linsed oil fatty acids, 1120 parts, are added to the flask, the condenser is changed to a distillation condenser and nitrogen gas is introduced into the flask. The flask contents are heated to 162° C. where distillation of acetic acid begins. Acetic acid is distilled over a nine hour period with the temperature of the flask contents rising to 241° C. A vacuum (100-mm. Hg pressure) is applied to the flask and the temperature is held at 233° C. to 243° C. for three hours and thirty minutes to insure complete removal of the acetic acid. A total of 454 parts of acetic acid is recovered. The flask contents are cooled to 56° C., the condenser is changed to a reflux condenser and 392 parts of maleic anhydride are added to the flask. The reactants are heated for eight hours at 180° C. to 215° C. to condense the maleic anhydride. After this heating period, infra-red analysis shows disappearance of peaks at 11.3 and 12.4 microns indicating that all the maleic anhydride has reacted. In order to open the maleic anhydride rings, the phenolic ester condensate is heated with 144 parts of water and 0.5 part of triethyl amine catalyst for three hours and twenty minutes at 97° C. to 105° C. Infra-red analysis shows no peak at 5.4 microns and a strong peak at 5.9 microns indicating complete opening of the anhydride rings to the acid. The condensate has an acid value of 199.

To a small beaker are added 20.7 parts of the phenolic ester condensate, 4.4 parts of 2-amino-2-methylpropanol-1 and 25 parts of water. The beaker contents are stirred while being heated on a hot plate. A clear viscous solution is obtained with a Gardner-Holdt viscosity of Z to Z–1 at 50 percent solids, and a Gardner color of 12.

*Example 4*

Using the equipment and procedure described in Example 3, 456 parts of bisphenol are reacted with 408 parts of acetic anhydride, followed by reaction with 1120 parts of linseed oil fatty acids. The formed di-linseed oil fatty acid diester of bisphenol is then condensed with 142 parts of maleic anhydride. After the condensation reaction is complete, as indicated by infra-red analysis, the anhydride rings are opened by reaction with 52 parts of water and 0.5 part of triethyl amine catalyst. The phenolic ester condensate has an acid value of 114.

To a small beaker are added 21.2 parts of the phenolic ester condensate, 3.8 parts of 2-amino-2-methylpropanol-1 and 25 parts of water. After heating and stirring, a clear solution is obtained having a Gardner-Holdt viscosity of X at 50 percent solids and a Gardner color of 11.

*Example 5*

To a 3-liter flask equipped as described in Example 3, are added 612 parts of acetic anhydride, 684 parts of bisphenol, 292 parts of adipic acid and 560 parts of linseed oil fatty acids. Heat is applied raising the temperature to 143° C. where refluxing begins. The temperature is held at 143° C. for one hour. The condenser is changed to a distillation condenser, and nitrogen gas is introduced into the flask. The temperature is raised to 147° C. where distillation begins. Distillation is continued over a four hour and thirty minute period while the flask temperature rises to 240° C. Vacuum is then applied to the flask (250-mm. Hg pressure) and heating is continued for one hour and forty minutes at 240° C. A total of 666 parts of distillate is recovered. The flask contents are cooled to room temperature and 196 parts of maleic anhydride are added. All the maleic anhydride has reacted after four hours heating at 190° C. to 201° C. as indicated by infra-red analysis. The anhydride rings are opened by heating the condensate with 72 parts of water and 0.5 part of triethyl amine catalyst. The acid value of the composition is 160.

The phenolic ester composition (19.9 parts) is dissolved in 25 parts of water and 0.1 parts of 2-amino-2-methylpropanol-1 by heating at 95° C. to 100° C. for two hours. The viscous aqueous solution obtained has a Gardner-Holdt viscosity of Z–3 to Z–4 at 50 percent solids, and a Gardner color of 12.

*Example 6*

Using the same procedure and equipment as described in Example 3, 456 parts of bisphenol are reacted with 408 parts of acetic anhydride, followed by reaction with 1120 parts of dehydrated castor oil fatty acid. After condensing the phenolic ester with 150 parts of maleic anhydride and opening the anhydride rings with 56 parts of water, using 0.5 part of triethyl amine, the acid value of the composition is 104.5.

The phenolic ester condensate (16.9 parts) is dissolved in 20 parts of water and 3.1 parts of 2-amino-2-methylpropanol-1. The aqueous solution at 50 percent solids has a Gardner-Holdt viscosity of Z–3 and a Gardner color of 11.

Films prepared from the aqueous solutions of the phenolic ester compositions of this invention are cured by heating at 350° F. for thirty minutes. However, superior films of excellent adhesion and good solvent and water resistance are obtained when driers are incorporated in the solutions. The preferred driers are cobalt and manganese naphthenates used in the amount of 0.005 weight percent to 0.03 weight percent of metal in the drier based upon the vehicle solids.

These water soluble phenolic ester condensates can also be cured by the use of water soluble aminoplast resins. Suitable water soluble aminoplasts are alkylated condensates formed by the reaction of amino-triazines and amino-diazines with aldehydes. It is known that various amines and amides will condense in the presence of alcohols with aldehydes to form alkylated aldehyde-amine and aldehyde-amine condensates. Thus, urea, thiourea and various substituted ureas and urea derivatives will react with aldehydes, such as formaldehyde, to form alkylated condensates. Similarly, it is known that melamines, such as melamine and benzoguanamine, will react with aldehydes, particularly formaldehyde to form melamine-aldehyde condensates. Such condensates which are water soluble can be used in this invention. Water soluble alkylated condensates result when the amino aldehyde or amide aldehyde resin is prepared in the presence of alcohols such as methyl, ethyl and isopropyl, these solvents actually becoming part of the resulting product. In general, 5 to 30 percent, based on the phenolic ester composition, of urea or melamine aldehyde condensates of different degrees of condensation can be used so long as they are water soluble. The preferred aminoplast resins are the alkylated melamine aldehyde condensates.

What is claimed is:
1. A process for preparing water soluble resinous compositions which comprises
    heat reacting
        an unsaturated dicarboxylic acid selected from the group consisting of maleic acid, maleic an- hydride, fumaric acid and itaconic acid with a phenolic ester of the general formula

wherein
F is the hydrocarbon portion of an unsaturated fatty acid, said acid containing 10 to 24 carbon atoms,
R is the aromatic nucleus of a dihydric phenol,
A is the hydrocarbon portion of an aliphatic dicarboxylic acid, said acid containing 4 to 36 carbon atoms and being free of polymerizable double bonds and
$n$ has a value of 0 to 2
wherein the unsaturated dicarboxylic acid and the phenolic ester are in a ratio so as to form a phenolic ester adduct having an acid value of 80 to 275 and then
reacting the resulting phenolic ester adduct with sufficient amino compound selected from the group consisting of ammonia and water soluble amines to form a water soluble amine salt of the phenolic ester adduct.

2. The process of claim 1 wherein the unsaturated dicarboxylic acid and the phenolic ester are within a molar ratio of 0.7 to 2:1.

3. The process of claim 1 wherein the water soluble amino compound is reacted with the phenolic ester condensate in the ratio of 1 amino nitrogen of the amino compound for each carboxylic acid group of the phenolic ester adduct.

4. An adduct of an unsaturated dicarboxylic acid and an unsaturated phenolic ester, useful as a binder for aqueous protective coating compositions, said adduct rendered water soluble by salt formation with an amino compound, said unsaturated dicarboxylic acid being selected from the group consisting of maleic acid, maleic anhydride, fumaric acid and itaconic acid, said unsaturated phenolic ester being represented by the general formula

wherein F is the hydrocarbon portion of an unsaturated fatty acid, said acid containing 10 to 24 carbon atoms, R is the aromatic nucleus of a dihydric phenol, A is the hydrocarbon portion of an aliphatic dicarboxylic acid, said acid containing 4 to 36 carbon atoms and being free of polymerizable double bonds, and $n$ has a value of 0 to 2, wherein the amino compound is selected from the group comprised of ammonia and water soluble amines.

5. The composition of claim 4 wherein the unsaturated dicarboxylic acid is maleic anhydride, the unsaturated fatty acid is linseed oil fatty acid, the dihydric phenol is bisphenol, the aliphatic dicarboxylic acid is succinic acid and $n$ is equal to two and wherein maleic anhydride and the unsaturated phenolic ester are reacted in a molar ratio of 2 mols of maleic anhydride to 1 mol of unsaturated phenolic ester.

6. The composition of claim 4 wherein the unsaturated dicarboxylic acid is fumaric acid and the unsaturated phenolic ester is the di-(dehydrated castor oil acid) ester of resorcinol and wherein the molar ratio of fumaric acid to unsaturated phenolic ester is 0.7 mol of fumaric acid to 1 mol of unsaturated phenolic ester.

7. The composition of claim 4 wherein the amino compound is an alkanol amine.

8. A water soluble coating vehicle comprised of a salt of 2-amino-2-methylpropanol-1 and an adduct of maleic anhydride and the di-(linseed oil acid) ester of bisphenol, the molar ratio of maleic anhydride to the di-(linseed oil acid) ester being 2 to 1.

9. A protective coating composition comprising an aqueous solution of an adduct of an unsaturated dicarboxylic acid and an unsaturated phenolic ester, said adduct rendered water soluble by salt formation with a water soluble amine, said unsaturated dicarboxylic acid being selected from the group consisting of maleic acid, maleic anhydride, fumaric acid, and itaconic acid, said unsaturated phenolic ester being represented by the general formula

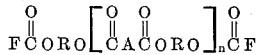

wherein F is the hydrocarbon portion of an unsaturated fatty acid, said acid containing 10 to 24 carbon atoms, R is the aromatic nucleus of a dihydric phenol, A is the hydrocarbon portion of an aliphatic dicarboxylic acid, said acid containing 4 to 36 carbon atoms and being free of polymerizable double bonds, and $n$ has a value of 0 to 2.

10. An unsaturated dicarboxylic acid adduct of an unsaturated fatty acid ester of a dihydric phenol, said adduct being soluble in an aqueous amine solution, said unsaturated dicarboxylic acid being selected from the group consisting of maleic acid, maleic anhydride, fumaric acid and itaconic acid, said unsaturated phenolic ester being represented by the general formula

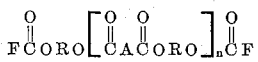

wherein F is the hydrocarbon portion of an unsaturated fatty acid, said acid containing 10 to 24 carbon atoms, R is the aromatic nucleus of a dihydric phenol, A is the hydrocarbon portion of an aliphatic dicarboxylic acid, said acid containing 4 to 36 carbon atoms and being free of polymerizable double bonds, and $n$ has a value of 0 to 2.

No references cited.

JOSEPH L. SCHOFER, *Primary Examiner.*
L. G. CHILDERS, *Assistant Examiner.*